(12) United States Patent
Hernandez et al.

(10) Patent No.: US 9,819,753 B2
(45) Date of Patent: Nov. 14, 2017

(54) SYSTEM AND METHOD FOR LOGGING AND REPORTING MOBILE DEVICE ACTIVITY INFORMATION

(75) Inventors: Sarah Hernandez, Berkeley, CA (US); Andrew Talbot, Berkeley, CA (US); Mitchell Scott Ozer, San Francisco, CA (US)

(73) Assignee: Location Labs, Inc., Emeryville, CA (US)

(*) Notice: Subject to any disclaimer, the term of this patent is extended or adjusted under 35 U.S.C. 154(b) by 744 days.

(21) Appl. No.: 13/351,092

(22) Filed: Jan. 16, 2012

(65) Prior Publication Data

US 2013/0143521 A1    Jun. 6, 2013

Related U.S. Application Data

(60) Provisional application No. 61/566,586, filed on Dec. 2, 2011.

(51) Int. Cl.
| | |
|---|---|
| *H04W 4/00* | (2009.01) |
| *H04M 15/00* | (2006.01) |
| *H04L 29/08* | (2006.01) |
| *H04W 4/24* | (2009.01) |
| *H04M 15/28* | (2006.01) |
| *G06Q 10/10* | (2012.01) |
| *H04L 12/26* | (2006.01) |

(52) U.S. Cl.
CPC ............ *H04L 67/22* (2013.01); *G06Q 10/10* (2013.01); *H04M 15/28* (2013.01); *H04M 15/58* (2013.01); *H04M 15/70* (2013.01); *H04W 4/24* (2013.01); *H04L 43/06* (2013.01); *H04M 15/72* (2013.01); *H04M 15/90* (2013.01); *H04M 2215/0176* (2013.01); *H04W 4/00* (2013.01)

(58) Field of Classification Search
USPC ...... 455/456.6, 419, 418, 405; 709/203, 206
See application file for complete search history.

(56) References Cited

U.S. PATENT DOCUMENTS

| | | |
|---|---|---|
| 4,956,825 A | 9/1990 | Wilts et al. |
| 5,434,562 A | 7/1995 | Reardon |
| 5,673,691 A | 10/1997 | Abrams et al. |
| 5,882,258 A | 3/1999 | Kelly et al. |
| 5,907,831 A | 5/1999 | Lotvin et al. |
| 5,973,683 A | 10/1999 | Cragun et al. |

(Continued)

FOREIGN PATENT DOCUMENTS

| | | |
|---|---|---|
| FR | 2863439 | 6/2005 |
| GB | 1770969 | 4/2007 |
| WO | WO 2011137279 | 3/2011 |

OTHER PUBLICATIONS

Kohavi, "Emerging Trends in Business Analytics", Communications of the ACM, Aug. 2002, vol. 45, No. 8, pp. 45-48.

*Primary Examiner* — William Nealon
(74) *Attorney, Agent, or Firm* — Dovas Law, P.C.

(57) ABSTRACT

A computer-implemented method for logging and reporting mobile device information is provided. The method includes receiving device activity information corresponding to use of a particular mobile device via a client executed on the particular mobile. The activity information is sorted based on at least one predetermined criterion, and the sorted activity information is reported to a user. The invention further provides a computer activity monitoring and reporting system.

16 Claims, 7 Drawing Sheets

(56) References Cited

U.S. PATENT DOCUMENTS

| | | | |
|---|---|---|---|
| 6,023,692 A | 2/2000 | Nichols | |
| 6,161,008 A | 12/2000 | Lee et al. | |
| 6,529,724 B1* | 3/2003 | Khazaka et al. | 455/405 |
| 6,731,746 B1* | 5/2004 | Usami | 379/356.01 |
| 7,178,720 B1 | 2/2007 | Strubbe et al. | |
| 7,257,367 B2 | 8/2007 | Etuk et al. | |
| 7,272,633 B2* | 9/2007 | Malik et al. | 709/206 |
| 7,729,945 B1 | 6/2010 | Katz et al. | |
| 7,839,891 B1 | 11/2010 | Allan | |
| 7,925,690 B2* | 4/2011 | Smith et al. | 709/203 |
| 8,010,037 B2 | 8/2011 | Bannwolf | |
| 8,024,290 B2 | 9/2011 | Yang et al. | |
| 8,095,413 B1 | 1/2012 | Beaven | |
| 8,121,879 B1 | 2/2012 | Cohen | |
| 8,135,392 B2 | 3/2012 | Marcellino et al. | |
| 8,160,560 B2 | 4/2012 | Geyer et al. | |
| 8,193,982 B2 | 6/2012 | Kupfer et al. | |
| 8,401,521 B2 | 3/2013 | Bennett et al. | |
| 8,621,075 B2 | 12/2013 | Luna | |
| 8,738,688 B2 | 5/2014 | Myers et al. | |
| 8,825,035 B2 | 9/2014 | Moton, Jr. et al. | |
| 8,843,122 B1 | 9/2014 | Wick et al. | |
| 8,849,095 B2 | 9/2014 | Hoofien et al. | |
| 8,856,322 B2 | 10/2014 | Dare et al. | |
| 9,124,703 B2 | 9/2015 | Tayadon et al. | |
| 2002/0012894 A1 | 1/2002 | Becker | |
| 2002/0174180 A1 | 11/2002 | Brown et al. | |
| 2002/0178046 A1 | 11/2002 | Lawrence | |
| 2003/0005306 A1 | 1/2003 | Hunt et al. | |
| 2003/0082508 A1 | 5/2003 | Barney | |
| 2003/0211889 A1 | 11/2003 | Walker et al. | |
| 2004/0024569 A1 | 2/2004 | Camillo | |
| 2004/0030599 A1 | 2/2004 | Sie et al. | |
| 2004/0039624 A1 | 2/2004 | Izekawa | |
| 2004/0083472 A1 | 4/2004 | Rao et al. | |
| 2004/0219493 A1 | 11/2004 | Phillips | |
| 2004/0267607 A1 | 12/2004 | Maddux | |
| 2005/0003895 A1 | 1/2005 | Nara | |
| 2005/0096030 A1 | 5/2005 | Boyd et al. | |
| 2005/0287502 A1 | 12/2005 | Southard et al. | |
| 2006/0085547 A1 | 4/2006 | Cormier | |
| 2006/0184792 A1 | 8/2006 | Berlin | |
| 2006/0270476 A1 | 11/2006 | Denkewicz | |
| 2007/0039624 A1 | 2/2007 | Roberts et al. | |
| 2007/0041545 A1* | 2/2007 | Gainsboro | 379/188 |
| 2007/0203872 A1 | 8/2007 | Flinn et al. | |
| 2007/0208802 A1 | 9/2007 | Barman et al. | |
| 2007/0263843 A1* | 11/2007 | Foxenland | 379/355.02 |
| 2008/0176585 A1* | 7/2008 | Eldering | 455/456.6 |
| 2008/0199199 A1 | 8/2008 | Kato et al. | |
| 2008/0201469 A1 | 8/2008 | Reasor et al. | |
| 2008/0246605 A1 | 10/2008 | Pfeffer et al. | |
| 2008/0299954 A1 | 12/2008 | Wright et al. | |
| 2009/0017750 A1 | 1/2009 | Marcinkiewicz | |
| 2009/0038005 A1 | 2/2009 | Howarth | |
| 2009/0055938 A1 | 2/2009 | Samuel | |
| 2009/0064316 A1 | 3/2009 | Liao et al. | |
| 2009/0089876 A1 | 4/2009 | Finamore et al. | |
| 2009/0181356 A1 | 7/2009 | Dasgupta | |
| 2009/0204471 A1 | 8/2009 | Elenbaas et al. | |
| 2009/0247124 A1 | 10/2009 | de Atley et al. | |
| 2009/0286218 A1 | 11/2009 | Johnson et al. | |
| 2009/0298019 A1 | 12/2009 | Rogan et al. | |
| 2010/0028844 A1 | 2/2010 | Wiseman | |
| 2010/0037088 A1 | 2/2010 | Krivopaltsev et al. | |
| 2010/0058446 A1 | 3/2010 | Thwaites | |
| 2010/0076274 A1 | 3/2010 | Severson | |
| 2010/0100618 A1 | 4/2010 | Kuhlke et al. | |
| 2010/0116884 A1 | 5/2010 | Alderucci et al. | |
| 2010/0125028 A1 | 5/2010 | Heppert | |
| 2010/0145976 A1 | 6/2010 | Higgins et al. | |
| 2010/0211887 A1 | 8/2010 | Woollcombe | |
| 2010/0235223 A1 | 9/2010 | Lyman | |
| 2010/0250352 A1 | 9/2010 | Moore | |
| 2010/0268768 A1 | 10/2010 | Kurtenbach et al. | |
| 2010/0285871 A1 | 11/2010 | Shah et al. | |
| 2010/0317420 A1 | 12/2010 | Hoffberg | |
| 2010/0330972 A1* | 12/2010 | Angiolillo | 455/418 |
| 2011/0029598 A1 | 2/2011 | Arnold et al. | |
| 2011/0045868 A1* | 2/2011 | Sheha et al. | 455/556.1 |
| 2011/0047078 A1 | 2/2011 | Ginter et al. | |
| 2011/0055546 A1* | 3/2011 | Klassen et al. | 713/150 |
| 2011/0070567 A1 | 3/2011 | Linton | |
| 2011/0236872 A1 | 9/2011 | Taylor | |
| 2011/0252375 A1 | 10/2011 | Chaudhri | |
| 2011/0302003 A1 | 12/2011 | Shirish et al. | |
| 2012/0008526 A1 | 1/2012 | Borghei | |
| 2012/0066088 A1 | 3/2012 | Murset | |
| 2012/0069131 A1 | 3/2012 | Abelow | |
| 2012/0131161 A1 | 5/2012 | Ferris et al. | |
| 2012/0135705 A1 | 5/2012 | Thaker | |
| 2012/0149352 A1 | 6/2012 | Backholm et al. | |
| 2012/0151384 A1 | 6/2012 | Stass et al. | |
| 2012/0157076 A1 | 6/2012 | Choi et al. | |
| 2012/0166285 A1 | 6/2012 | Shapiro et al. | |
| 2012/0172027 A1 | 7/2012 | Partheesh et al. | |
| 2012/0172100 A1 | 7/2012 | Colar et al. | |
| 2012/0179767 A1 | 7/2012 | Clarke et al. | |
| 2012/0214472 A1 | 8/2012 | Tayadon et al. | |
| 2012/0215328 A1 | 8/2012 | Schmelzer | |
| 2012/0226704 A1* | 9/2012 | Boland et al. | 707/749 |
| 2012/0253918 A1 | 10/2012 | Marois et al. | |
| 2012/0254949 A1 | 10/2012 | Mikkonen et al. | |
| 2012/0260118 A1 | 10/2012 | Jiang et al. | |
| 2012/0280916 A1 | 11/2012 | Xia et al. | |
| 2012/0323990 A1 | 12/2012 | Hayworth | |
| 2012/0330702 A1 | 12/2012 | Kowalski et al. | |
| 2013/0040629 A1 | 2/2013 | Sprigg et al. | |
| 2013/0084847 A1 | 4/2013 | Tibbitts et al. | |
| 2013/0091453 A1 | 4/2013 | Kotler et al. | |
| 2013/0104246 A1 | 4/2013 | Baer et al. | |
| 2013/0111462 A1 | 5/2013 | Umansky et al. | |
| 2013/0111510 A1 | 5/2013 | Baker et al. | |
| 2013/0143512 A1 | 6/2013 | Hernandez et al. | |
| 2013/0145007 A1 | 6/2013 | Randazzo et al. | |
| 2013/0185411 A1 | 7/2013 | Martin | |
| 2013/0198272 A1 | 8/2013 | Shionoya et al. | |
| 2013/0198296 A1 | 8/2013 | Roy et al. | |
| 2013/0225151 A1 | 8/2013 | King et al. | |
| 2013/0305384 A1 | 11/2013 | Weiss | |
| 2013/0316746 A1 | 11/2013 | Miller et al. | |
| 2013/0332886 A1 | 12/2013 | Cranfill et al. | |
| 2013/0339345 A1 | 12/2013 | Soto et al. | |
| 2013/0346333 A1 | 12/2013 | Hassler et al. | |
| 2014/0082065 A1 | 3/2014 | Anakata | |
| 2014/0108649 A1 | 4/2014 | Barton et al. | |
| 2014/0143108 A1 | 5/2014 | Smith et al. | |
| 2014/0236846 A1 | 8/2014 | Melika et al. | |
| 2014/0310327 A1 | 10/2014 | Yip et al. | |
| 2014/0310365 A1 | 10/2014 | Sample et al. | |
| 2014/0310403 A1 | 10/2014 | Weiss et al. | |
| 2014/0316990 A1 | 10/2014 | Winston | |
| 2014/0338006 A1 | 11/2014 | Grkov et al. | |
| 2015/0040246 A1 | 2/2015 | Yuen et al. | |
| 2015/0058488 A1 | 2/2015 | Backholm | |
| 2015/0095970 A1 | 4/2015 | Shetty | |
| 2015/0097669 A1 | 4/2015 | Li | |
| 2015/0099500 A1 | 4/2015 | Chalmers | |
| 2015/0163664 A1 | 6/2015 | Martin | |
| 2015/0169853 A1 | 6/2015 | Singh | |
| 2015/0188777 A1 | 7/2015 | Frost | |
| 2015/0350410 A1 | 12/2015 | Weiss et al. | |
| 2017/0132424 A9 | 5/2017 | Anakata | |

\* cited by examiner

SYSTEM AND METHOD FOR LOGGING AND REPORTING MOBILE DEVICE ACTIVITY INFORMATION

CROSS REFERENCE TO RELATED APPLICATION(S)

This application claims the benefit of U.S. Provisional Application No. 61/566,586, filed Dec. 2, 2011, which is incorporated by reference as if fully set forth.

BACKGROUND

With the growing ubiquity of mobile communication devices such as smart phones and the like, comes the increasing desire to monitor their use. Parents want to know who their children are calling. Employers want to know their employees' communication habits during work. Users want to study their own mobile communication device usage, for example to assist in selecting a suitable mobile device, telecommunication carrier or service plan. Data provided in a telecommunication service provider bill may be insufficient and not suitably presented to provide an understanding of mobile communication device use.

SUMMARY

The invention provides a computer-implemented method for logging and reporting mobile device information. The method includes receiving device activity information corresponding to use of a particular mobile device via a client executed on the particular mobile device. The activity information is sorted based on at least one predetermined criterion, and the sorted activity information is reported to a user.

The invention further provides a computer activity monitoring and reporting system comprising at least one computing system including at least one memory comprising instructions operable to enable the at least one computing system to perform a procedure. The procedure includes receiving device activity information corresponding to use of a particular mobile device via a client executed on the particular mobile device. The activity information is sorted based on at least one predetermined criterion, and the sorted activity information is reported to a user.

The invention further provides non-transitory computer-readable media tangibly embodying a program of instructions executable by a processor to implement a method. The method includes receiving device activity information corresponding to use of a particular mobile device via a client executed on the particular mobile device. The activity information is sorted based on at least one predetermined criterion, and the sorted activity information is reported to a user.

BRIEF DESCRIPTION OF THE DRAWING(S)

The following detailed description will be readily understood in conjunction with the appended drawings which illustrate embodiments of the invention. In the drawings.

DETAILED DESCRIPTION OF ILLUSTRATIVE EMBODIMENT(S)

This invention provides a system and method for logging mobile device use and information and supplying numerical and visual diagrams for user analysis and comparison. Logs operatively associated with applications which monitor device activity include information such as date, time, contact details (e.g. name, phone number, email address, or other details), activity type (e.g. text message, email, phone call, application used, contact information, or other activity information), and content from interactions (e.g. text message content or email content). This data allows comparison of data over a span of time and is presented in different ways to highlight different types of data collected, for example in the form of numerical totals, visual graphs and tables.

Information is collected from a mobile device via a client application installed on the device and is stored in a server database. The information is retrieved by a user for example via a web application, where it is displayed and organized for the user to observe and gain insight into device use and patterns.

Figure 1:
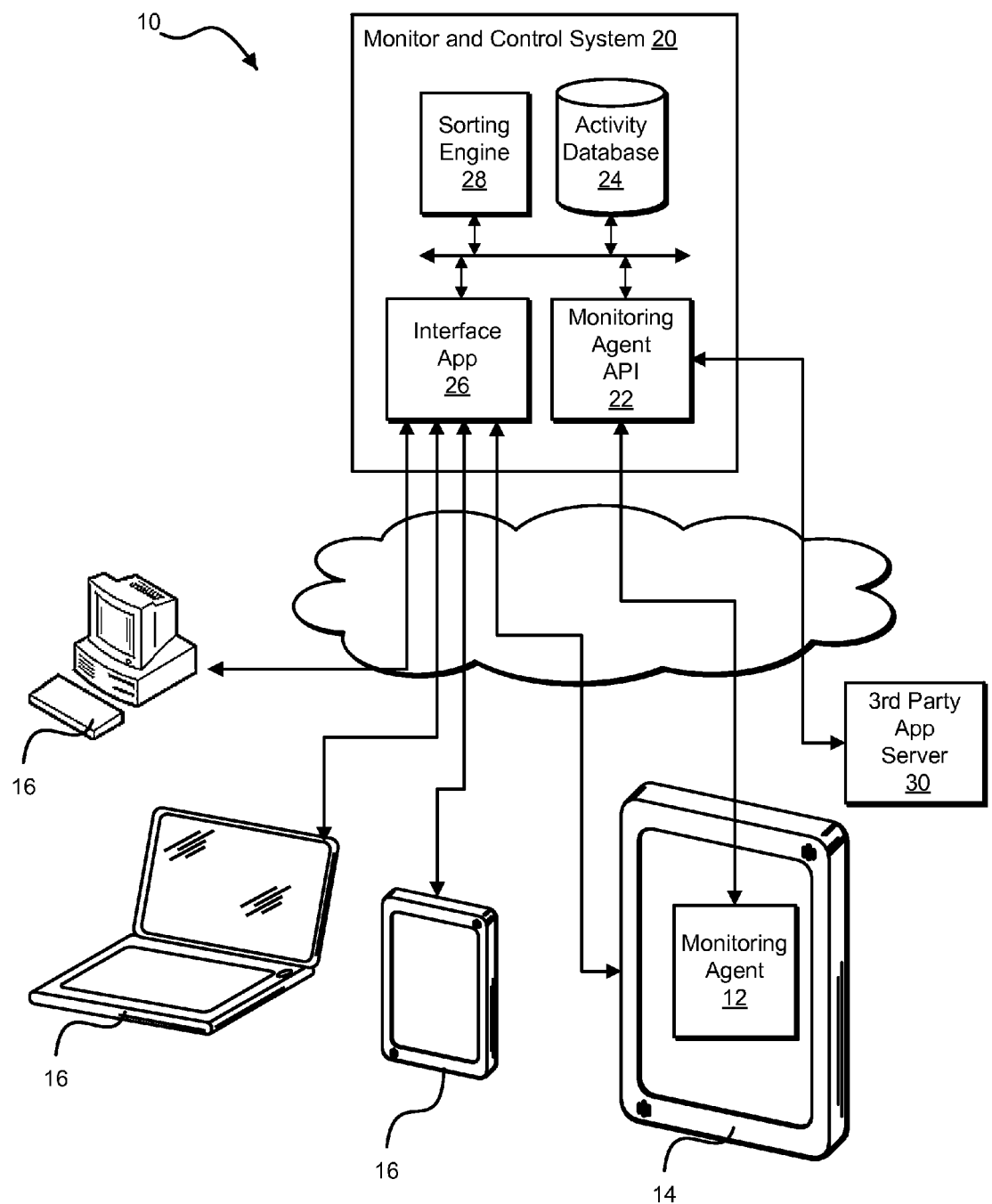
FIG. 1 shows a system for logging and reporting mobile device activity information according to the invention.

Referring to FIG. 1, an illustrative system 10 according to the invention includes a monitoring agent 12 for collecting and sending activity of a particular device user. The monitoring agent 12 is preferably a mobile client application executed by a mobile communication device 14 ("mobile device"), for example a smart phone. A monitor and control system 20 enables an application program interface ("API") 22 which retrieves activity information from the monitoring agent 12 and stores activity information in an activity database 24. An interface application 26 retrieves and displays activity information corresponding to the device user stored in the activity database 24. The interface application 26 is preferably a web application operable via a web browser on any suitable network-enabled computing device, including for example the computing devices 16 or the monitored mobile communication device 14. Alternatively, the interface application 26 can include any application type suitable for providing information to a computing device.

The monitor and control system 20 is configured to sort activity information based on user preference, for example via a sorting engine 28, in real-time or on the fly, to enable viewing data chronologically (e.g. date or time), by keyword search, by contact details (i.e. with whom communications were initiated), or by the type of activity (e.g. phone calls, short message service ("SMS") messages, instant messages ("IMs"), applications used, or other activities). An activity information history is logged, stored and rendered accessible for long-term and short-term comparisons via the activity database 24. Important events are also logged and used to provide more up-to-date activity alerts and notifications related to use of the monitored mobile device 14. A user accessing the interface application 26 via a computing device 16 can trigger transmissions from the monitoring agent 12 to the monitor and control system 20 via the monitoring agent API 22. The user can further trigger sorting of the transmissions.

Notifications that are sent from the monitoring agent 12 to a monitoring user via the interface application 26 are also included in the logs stored in the activity database 24. Data corresponding to a particular monitored user is preferably stored in the activity database 24 as one log. However, different logs can be generated by filtering the logs for more specialized lists via the interface application 26, for example based on preferences of a monitoring user. Logs can include for example indications of alerts, SMSs, phone calls, applications used, or other recorded activities.

The monitor and control system 20 is further enabled to effect locking controls on a monitored user's mobile device 14 via the monitoring agent 12 pursuant to instructions received by a monitoring user via the interface application 26. The monitoring user can select time periods when features of the mobile communication device 14, such as phone calling, text message transmission to and reception by a monitored user are to be enabled or disabled.

In a first example, a child mobile device user "Sally" just received a new mobile device from her parents and uses it non-stop. Via the interface application 26, her parents enable the monitoring agent 12 on Sally's mobile device 14 to begin logging her mobile device activity. The parents monitor Sally's activity on her mobile device 14 via their computing device 16. The parents notice from data retrieved via the interface application 26 that Sally constantly sends text messages to a mobile number they don't recognize. Through further investigation of the retrieved data, they realize the text messages were communications with a boy Sally recently met online 3 weeks prior.

In a second example, Jerry installs the monitoring agent 12 on his mobile communication device 14 and collects activity information over a 5-year period. Jerry would like to find out how much time he spends on average in work-related phone calls vs. social phone calls in order to better manage his time and to decide whether having a separate mobile device for work is worth having. Through interactive logging enabled by the interface application 26, Jerry sorts activity information based on what is important to him to know and determines if it is worth incurring the expense of a separate account. Sorting methods enabled by the sorting engine 28 to enable Jerry's research include:
  sorting calls based on a contact name;
  grouping all contacts from work into one chart to see the average total duration of phone calls;
  grouping all contacts he considers friends or family into another chart;
  comparing graphs of related information to make a decision or gain insight.

Contacts can be ranked based on an algorithm that takes into consideration an amount of time or number of communications between a monitored user and a particular contact, for example a number of calls to or an amount of time talking to a particular contact on the phone and the number of text messages sent to or received from the particular contact. A particular contact may be designated as a flagged contact, which will alert the monitoring user if the monitored device is used to talk to the particular contact or other communication is initiated with the particular contact.

Mobile communication devices can be used for communication in a variety of ways including phone calls and electronic text messages (e.g. SMSs). When presenting this information to an individual, it is desirable to list the contacts in order of the amount of communication between that contact and the monitored mobile device. For example, a parent may wish to know who their child talks to the most on the phone. This invention provides a means of ranking contacts who a monitored user may be communicating with in a variety of ways by assigning a quantitative measure to each form of communication. For example, a number of minutes spent talking on the phone and a number of text messages sent can be combined to achieve a single quantitative measure of communication with a particular contact. In another example, a phone call can correspond to a first factor and an electronic text message can correspond to a second factor, wherein the number of minutes in the phone call are multiplied by the first factor and the number of electronic text messages are multiplied by the second factor, and the results are summed to achieve the quantitative measure. Based on a determined quantitative measure, contacts can be ranked from most frequently communicated with to least frequently communicated with. Alternatively, a plurality of quantitative measures can be calculated for a contact.

An individual may want to monitor communication of a particular monitored user with a particular contact more closely. For example, a mother may want to know whether her child is talking to a particular new friend. This invention enables an individual to designate (flag) one or more contacts to be monitored extra carefully. Preferably, flagged contacts correspond to a lower threshold of notification. When a monitored mobile device is used to communicate in any way with such flagged contacts, the individual monitoring the device is preferably alerted by means of a message within a software application, an electronic text message, or an email.

Figure 2:
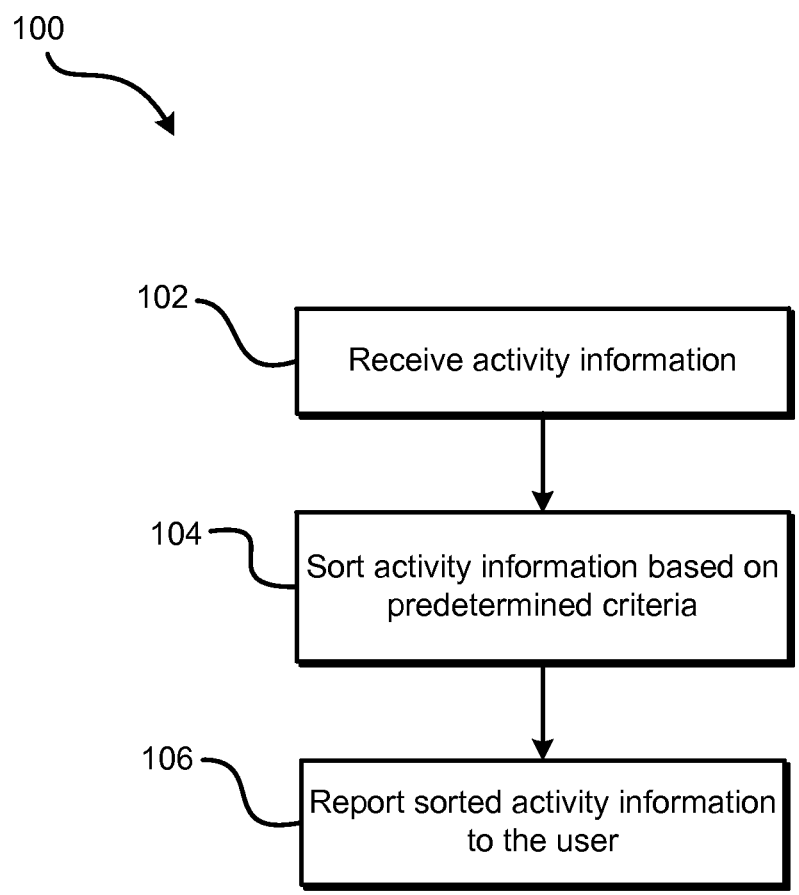
FIGS. 2-3 are diagrams showing methods for logging and reporting mobile device activity information according to the invention.

Referring to FIG. 2, a diagram shows a method 100 for logging and reporting mobile device activity which can be implemented for example by the above-described monitor and control system 20. Activity information corresponding to use of a particular mobile device is received via a client executed on the particular mobile device (step 102). Activity information corresponds for example to recorded phone use, application use and electronic messaging use. The activity information is sorted based on one or more predetermined criterion (step 104), and the sorted activity information is reported to a user (step 106). The sorting engine 28 can perform the sorting based on predetermined criteria which is system defined or defined via sorting instructions received from a user, for example via the interface application 26.

Figure 3:
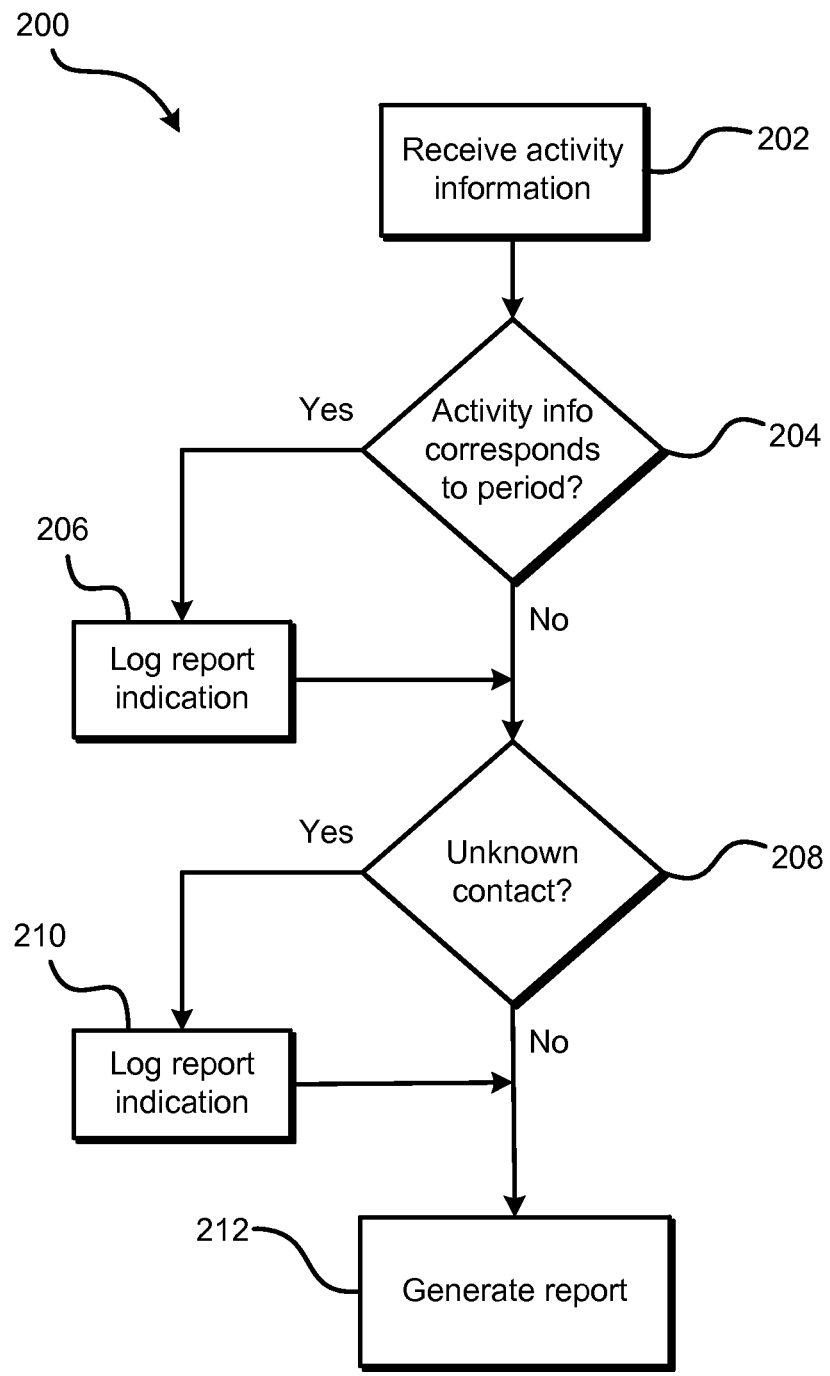

Referring to FIG. 3, a diagram shows a method 200 according to the invention which can further be implemented via the above-described monitor and control system 20. Device activity information is received (step 202). It is determined if the activity information corresponds to a predetermined period of time (step 204), and if so a corresponding report indication is logged (step 206). It is further determined if the activity information corresponds to communication with an unknown contact (step 208), and if so a corresponding report indication is logged (step 210). A report including logged indications is generated and provided to a user (step 212). Logged report indications are reported to a user, for example via the interface application 26 in communication with a computing device 16 of a monitoring user.

Figure 4:
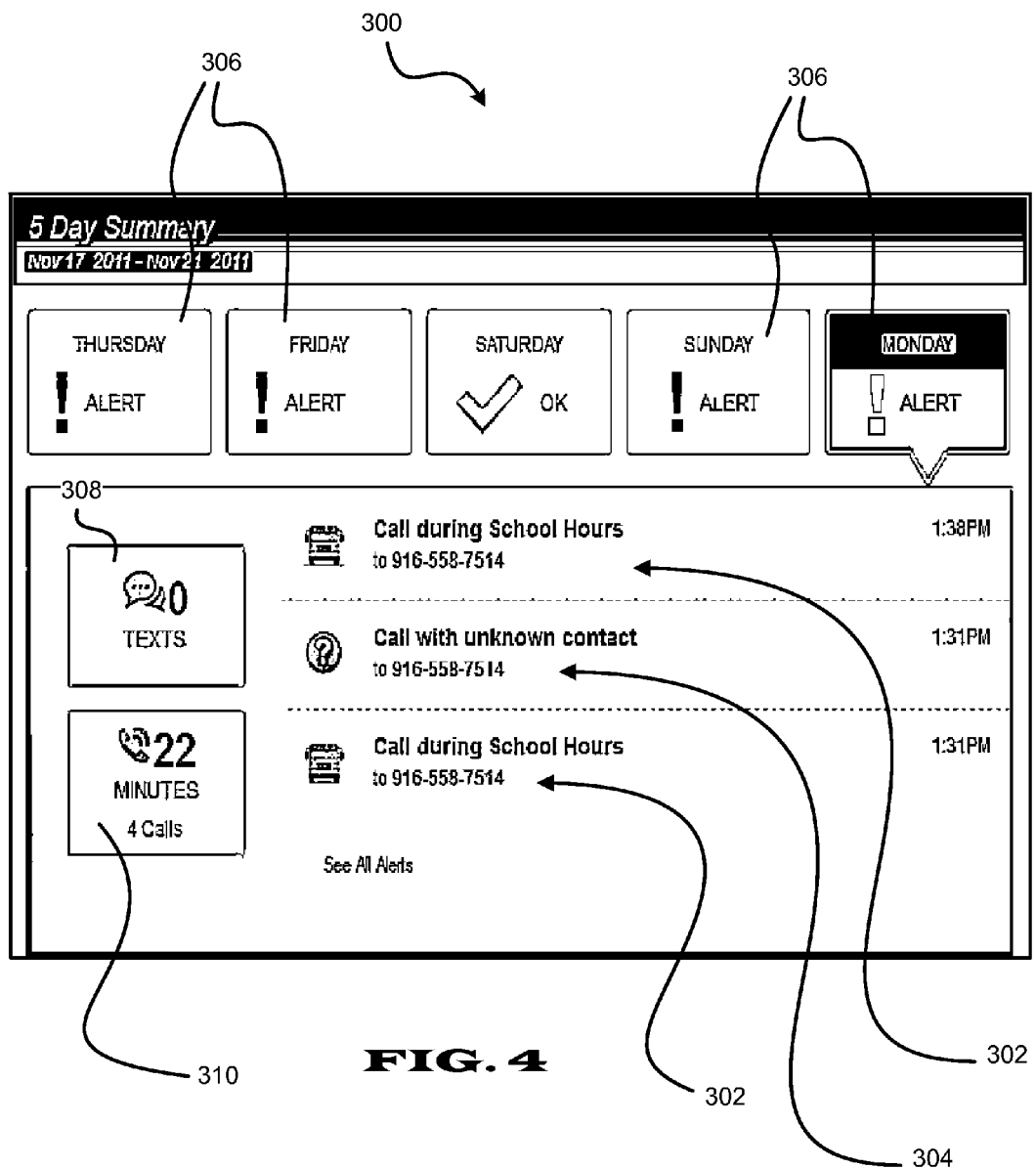
FIG. 4 is a screen capture of an interface showing a report with monitored phone call and electronic text message history according to the invention.

FIG. 4 is a screen capture of an interface 300 including an example report generated according to the methods 100 and 200 showing monitored phone call and electronic text message history. The report includes indications 302 of logged phone calls by a monitored user which occurred on a particular day ("Monday") during a particular predetermined time period (i.e. "school hours"). The report further includes an indication 304 of a phone call by a monitored user with an unknown contact on the particular day, for example a contact not corresponding to identifying information stored in the activity database 24, for example identifying information recorded by the monitoring agent 12. Indications of days of the week are shown with indications of alerts 306 for each day of the week in which phone calls or electronic messages correspond to the particular predetermined time period or correspond to one or more unknown contacts. Alternatively, activity information corresponding to any predetermined criterion can trigger an alert for a particular day and generation of a report. Activity information is quantified and reported with a display 308 of a number of electronic text messages on the particular day and a display 310 of a duration of phone calls on the particular day including phone calls corresponding to the indications 302, 304 and other phone calls not corresponding to an alert.

Figure 5:
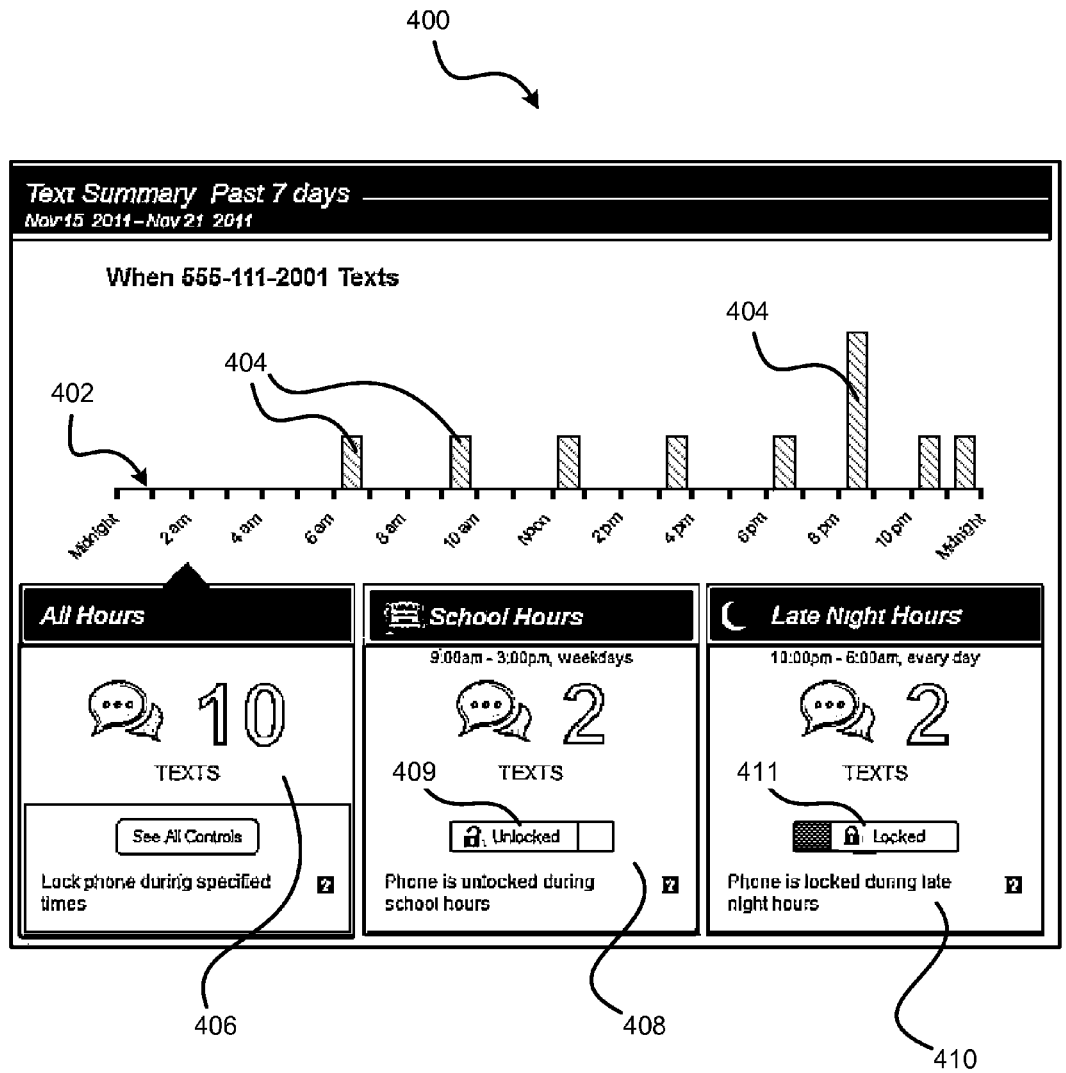
FIG. 5 is a screen capture of an interface showing a report with monitored electronic text message history according to the invention.

The monitor and control system 20 is further configured to determine from received activity information a total duration of phone calls and a total number of electronic messages which occur in a plurality of predetermined time slots in a day. One or more displays are provided to a monitoring user reporting the total duration of phone calls and/or the total number of electronic messages which occurred at each of the plurality of predetermined time slots. FIG. 5 is a screen capture of an interface 400 including an example report generated according to the invention showing monitored short message service ("SMS") history of a particular monitored user of a mobile device as provided to a monitoring user. Hourly slots are displayed on a bar graph 402 with bars indicative of activity levels, specifically electronic text messages, occurring at respectively hourly slots during a seven day period. A display box 406 slot shows the total number of electronic text messages transmitted and received in the seven day period by the particular user. A display box 408 corresponding to a time slot between 9:00 am and 3:00 pm ("School Hours") shows the number of electronic text messages transmitted and received between 9:00 am and 3:00 pm in the seven day period by the particular user. A display box 410 corresponding to a time slot between 10:00 pm and 6:00 am ("Late Night Hours") shows the number of electronic text messages transmitted and received between 9:00 am and 3:00 pm in a seven day period by the particular user. The display boxes 408 and 410 further provide indications 409, 411 of whether particular functionality (e.g. electronic messaging or phone use) of the monitored mobile device is enabled ("unlocked") or disabled ("locked"). The indications 409 and 411 further function as tools to allow the monitoring user to provide instructions to enable or disable such functionality, wherein the monitor and control system 20 is enabled to receive the instructions via the interface application 26.

Figure 6:
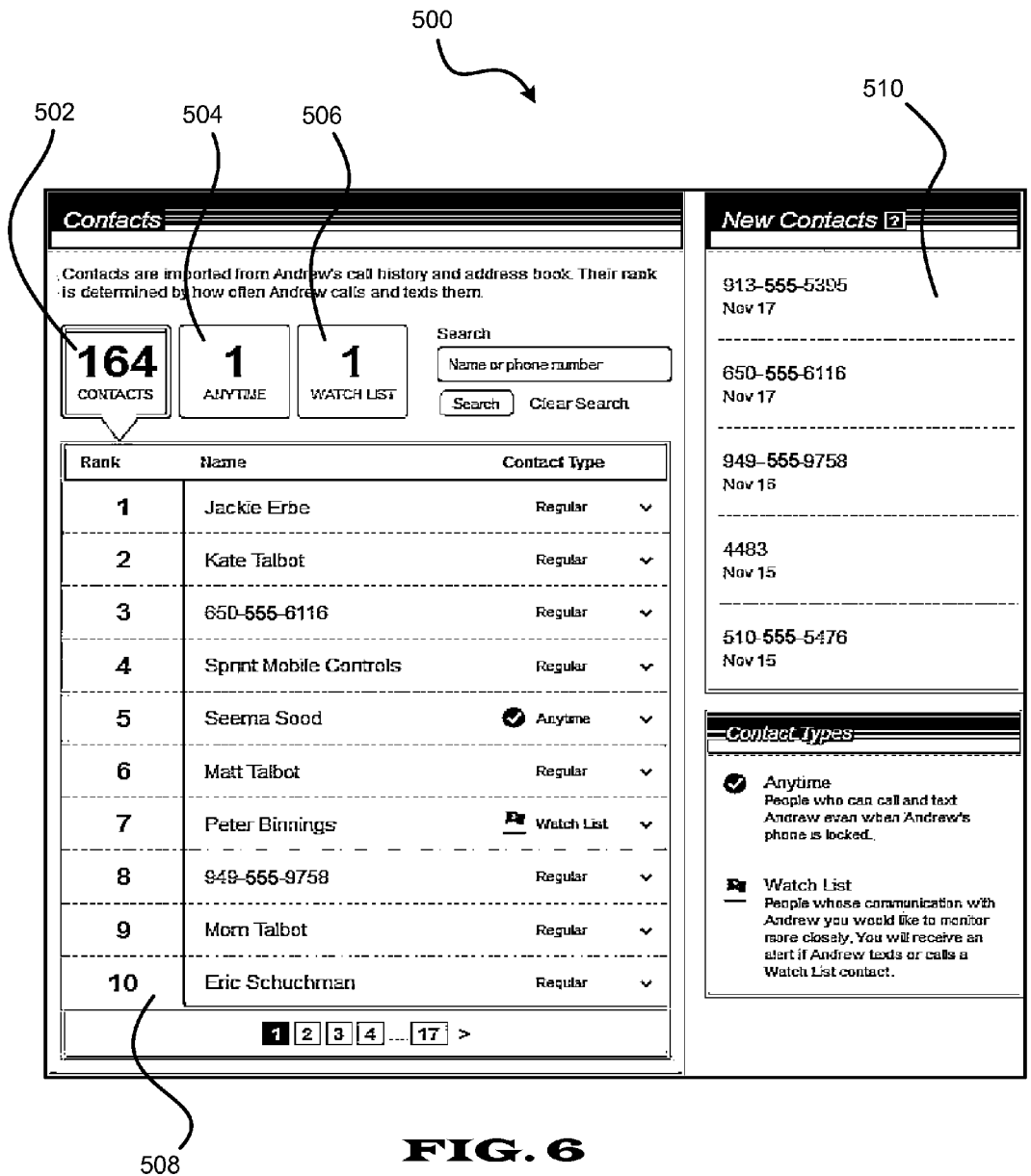
FIG. 6 is a screen capture of an interface showing a report with ranked monitored communications according to the invention.

The monitor and control system 20 is further configured to determine a plurality of contacts of the monitored user via a phone call or messaging history or a contact listing stored on the mobile communication device 14 or remote network location, for example a third party application server 30. A communication level of the plurality of contacts is determined and rankings of the plurality of contacts are generated and displayed based on their respective communication levels. FIG. 6 is a screen capture of an interface 500 including an example report generated according to the invention showing ranked monitored call history of a monitored user ("Andrew") as provided to a monitoring user. A number of determined contacts are shown in a display box 502. A display box 504 shows a number of contacts designated as able to phone call or electronically text to a monitored user even when the phone calling and text messaging functionality is disabled ("locked") to other non-designated contacts. A display box 506 shows a number of contacts whose communications with the particular monitored user the monitoring user would like to watch more closely, for example based on a selection by the monitoring user. A display box 508 lists contacts based on a determined communication level, wherein contacts are listed from most frequently communicated with to least frequently communicated with. The communication level can be determined based on a number of electronic text messages to or from each contact and the duration or number of phone calls with each contact, for example by applying different predetermined factors or algorithms to different communication types as described above. A display box 510 identifies phone numbers or other identifiers of contacts identified by the monitor and control system 20 within a predetermined period of time, for example within the past week or since a prior report was generated by the system 20.

Figure 7:
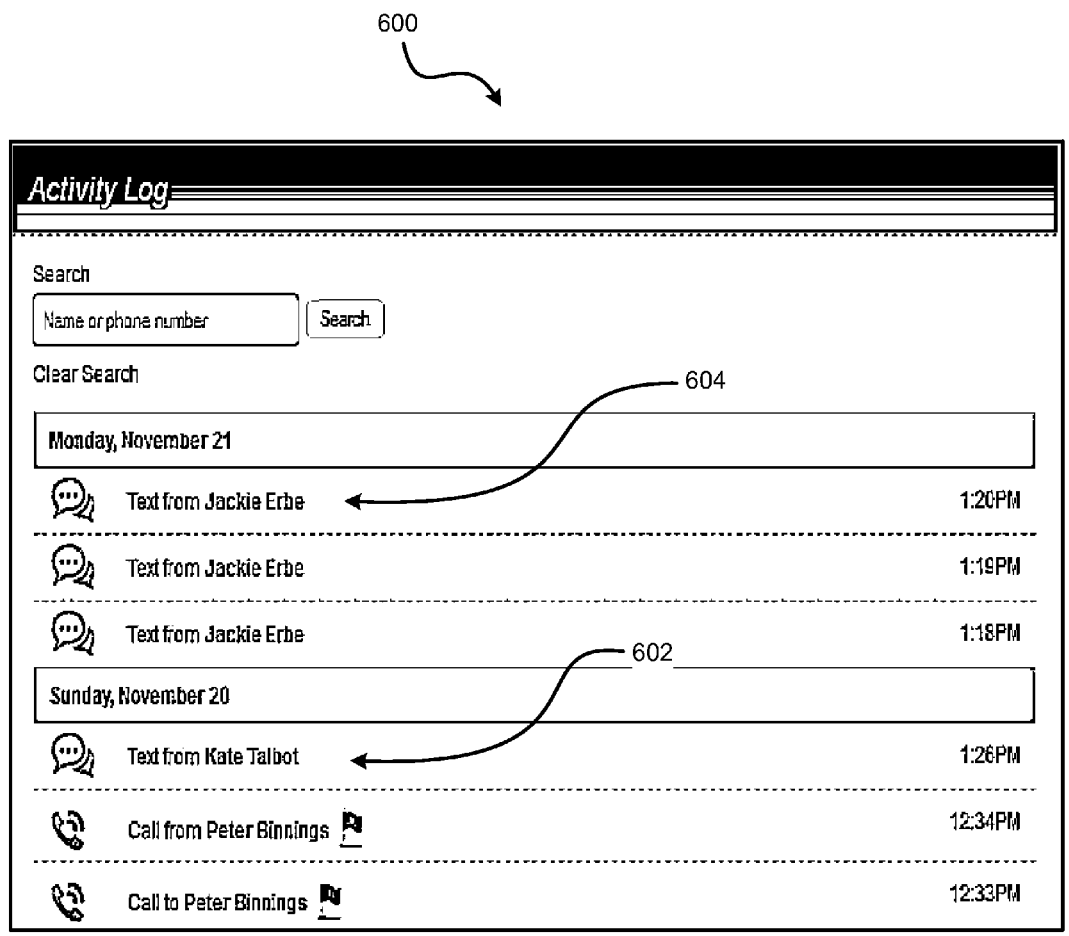
FIG. 7 is a screen capture of an interface showing a report with monitored call and electronic text message history according to the invention.

FIG. 7 is a screen capture of an interface 600 including an example report according to the invention showing monitored call and SMS history of a monitored user as provided to a monitoring user. A display box 602 provides details of the monitored user's communications on a first day, and display box 604 provides details of the monitored user's communications on a second day.

While embodiments of the invention have been described in detail, the invention is not limited to the specific embodiments described above, which should be considered as merely exemplary. Further modifications and extensions of the invention may be developed, and all such modifications are deemed to be within the scope of the invention as defined by the appended claims.

What is claimed is:

1. A computer-implemented method for logging and reporting mobile device information comprising:
receiving device activity information corresponding to use of a particular mobile device via a client executed on the particular mobile device;
sorting the activity information based on at least one predetermined criterion;
for each of a plurality of days determining if the activity information corresponds to a predetermined period of time on the respective day;
providing a display to a user showing a plurality of graphical indications respectively corresponding to at least one of the plurality of days; and
providing an indication of an alert to the user for each of the plurality of days for which the activity information corresponds to the predetermined period of time, wherein the alert is graphically displayed in conjunction with a respective indication of a day to show an association between the alert and the respective indication of the day.

2. The computer-implemented method of claim 1, further comprising:
receiving sorting instructions from the user; and
defining the at least one predetermined criterion based on the sorting instructions.

3. A computer-implemented method for logging and reporting mobile device information comprising:
receiving device activity information corresponding to use of a particular mobile device via a client executed on the particular mobile device;

sorting the activity information based on at least one predetermined criterion;

for each of a plurality of predetermined time slots in a day, determining from the activity information at least one of a total duration of phone calls or a total number of electronic messages which occurred; and providing a display to a user showing a plurality of graphical indications respectively corresponding to at least one of a plurality of days or a plurality of time slots in a day and reporting to the user the at least one of the total duration of phone calls or the total number of electronic messages which occurred at each of the plurality of predetermined time slots in the day, the time slots and the at least one of the total duration of phone calls or the total number of electronic messages depicted graphically in the display to report the sorted activity information to the user.

4. The computer-implemented method of claim 3, the method further comprising:

for a particular time slot, enabling a user-actuatable tool in visible proximity to the display reporting to the user the at least one of the total duration of phone calls or the total number of electronic messages, the user-actuatable tool configured to enable and disable functionality of the particular mobile device during the particular time slot;

receiving an instruction from the user to enable or disable functionality of the particular mobile device via the user-actuatable tool during the particular time slot; and providing a command to the client to enable or disable the functionality of the particular mobile device pursuant to the instruction during the particular time slot.

5. A computer-implemented method for logging and reporting mobile device information comprising:

receiving device activity information corresponding to use of a particular mobile device via a client executed on the particular mobile device;

sorting the activity information based on at least one predetermined criterion; and for each of a plurality of days determining if the respective day corresponds to the at least one predetermined criterion;

providing a display to a user showing a plurality of graphical indications respectively corresponding to the plurality of days to report the sorted activity information to the user; and providing an indication of an alert to the user for each of the plurality of days corresponding to the at least one predetermined criterion, wherein the alert is graphically displayed in conjunction with a respective indication of a day to show an association between the alert and the respective indication of the day.

6. A computer-implemented method for logging and reporting mobile device information comprising:

receiving device activity information corresponding to use of a particular mobile device via a client executed on the particular mobile device;

sorting the activity information based on at least one predetermined criterion;

for each of a plurality of predetermined time slots during at least one day, determining from the activity information an activity level; and providing a display to a user showing a plurality of graphical indications respectively corresponding to the plurality predetermined time slots and graphically reporting to the user the activity level at each of the plurality of predetermined time slots in the at least one day to report the sorted activity information to the user.

7. The computer-implemented method of claim 3, wherein the activity information corresponds to communications performed via the mobile device with a plurality of contacts, the method further comprising:

determining a communication level of the plurality of contacts;

generating rankings of the plurality of contacts based on their respective communication levels; and providing a display to the user showing the rankings of the plurality of contacts.

8. The computer-implemented method of claim 7, further comprising determining the communication level based on at least two forms of communication.

9. The computer-implemented method of claim 8, further comprising determining the communication level of the plurality of contacts based on a first factor corresponding to a first form of communication and a second factor corresponding to a second form of communication.

10. The computer-implemented method of claim 8, wherein the at least two forms of communication comprise phone communications and electronic messages.

11. The computer-implemented method of claim 10, further comprising determining the communication level of the plurality of contacts based on a first factor corresponding to phone communications and a second factor corresponding to electronic messages.

12. The computer-implemented method of claim 1, further comprising:

identifying contacts corresponding to the particular mobile device; and reporting to the user contact identifying information corresponding to contacts identified within the predetermined period of time.

13. The computer-implemented method of claim 5, the method further comprising:

determining if the activity information corresponds to a predetermined period of time; and reporting to the user that the activity information corresponds to the predetermined period of time.

14. The computer-implemented method of claim 5, the method further comprising:

determining if the activity information corresponds to a previously unrecorded contact; and reporting to the user that the activity information corresponds to the previously unrecorded contact.

15. The computer-implemented method of claim 14, the method further comprising:

for each of the plurality of days determining if the activity information corresponds to a predetermined period of time on the respective day; and providing the indication of the alert to the user for each of the plurality of days for which the activity information corresponds to the predetermined period of time.

16. The computer-implemented method of claim 11, wherein the activity information corresponds to at least one of phone call records or electronic messaging records:

determining from the activity information at least one of a total duration of phone calls which occurred during a predetermined period of time or a total number of electronic messages which occurred during the predetermined period time; and reporting to the user the at least one of the total duration of phone calls which occurred during the predetermined period of time or the total number of electronic messages which occurred during the predetermined period time.

\* \* \* \* \*